April 1, 1930.  G. H. MAUS  1,752,447
RAKE
Filed Feb. 17, 1928
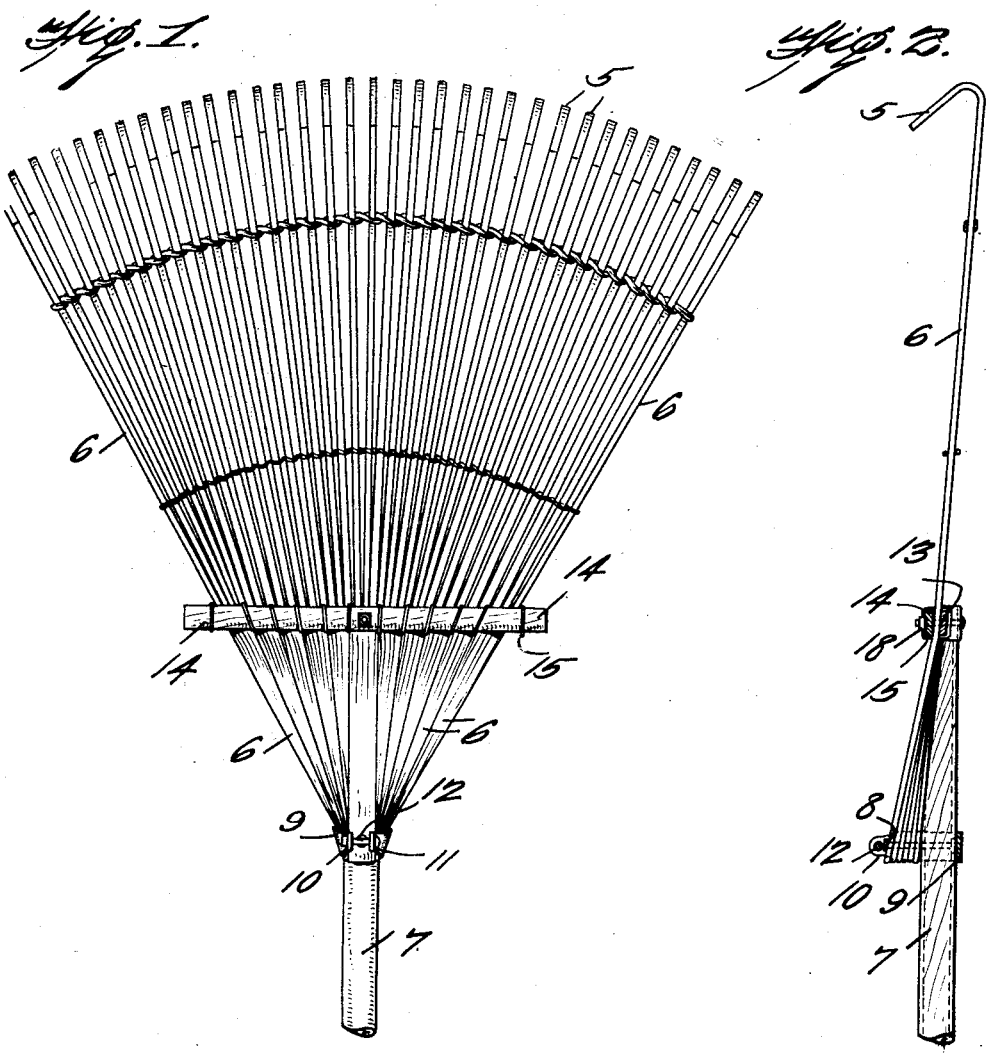
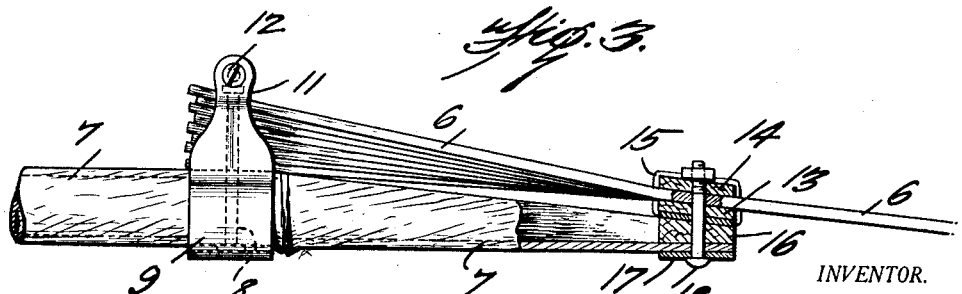
INVENTOR.
BY George Henry Maus
ATTORNEY.

Patented Apr. 1, 1930

1,752,447

UNITED STATES PATENT OFFICE

GEORGE HENRY MAUS, OF AMSTERDAM, NEW YORK

RAKE

Application filed February 17, 1928. Serial No. 255,089.

This invention relates to rakes constructed of wood, bamboo, or the like, and has for an object the improvement of rakes of this character through the employment of novel means for holding the butts of the teeth with relation to a handle, the reinforcement of the end of the handle where the teeth are anchored to the said end, and furthermore in the provision of a novel clamp or attachment for retaining the butts of the teeth, through which means strain on the device is transferred to the attachment itself, rather than to portions of the head of the rake or the handle.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of a rake embodying the invention;

Figure 2 illustrates a longitudinal sectional view thereof with the clamp omitted; and Figure 3 illustrates an enlarged view similar to that of Fig. 2 with the clamp in place.

In the present embodiment of the invention, the teeth 5 of the rake are formed as parts of bamboo strips 6, whose butts or inner ends converge with respect to a handle 7, the said butts being superimposed and having a fastening 8 extending through them and through the handle for holding the parts assembled. It is the purpose of the inventor to reinforce this fastening in a manner to relieve the strain on the said fastening and on the joints between it and the several elements through which it extends and, to that end, a clip or clamp 9 is provided and it embraces the handle and has its sides 10 and 11 extending approximately parallel with the edges and beyond the plane of the outer of the superimposed butts. The butts, in the present showing, are located under the rake handle, but, obviously, these parts could be reversed. The ends of the clip are connected together by a fastening 12, such as a bolt or the like, which serves to draw the sides of the clip together and to bind the butts of the teeth securely to the handle.

Reinforcing ribs 13 and 14 extend transversely of the teeth near their inner ends and they are bound to the teeth by flexible wrappings 15, such as wire, that encircle the reinforcing ribs and extend between the edges of the bamboo from which the teeth are formed.

The end of the handle 7 when a bamboo or hollow handle is used is preferably provided with a reinforcing plug 16 and the said plug and handle are embraced by a ferrule or band 17 of metal, and this, with the plug 16, constitutes an anchorage for a fastening 18, such as a bolt, that extends through the reinforcing ribs for retaining the rake at the end of the handle. The rake is therefore anchored to the handle at two locations by devices that are strong and durable, although they are comparatively inexpensive instrumentalities for increasing the durability and efficiency of the rake.

I claim:

A rake comprising strips of material arranged in superimposed relation to one another at their inner ends and diverging therefrom to their outer ends, the said strips being provided with teeth at the said outer ends, a handle with relation to which the superimposed ends of the strips are assembled, a clamp embracing the handle and the superimposed strips at the inner ends of said strips, the ends of the clamp extending beyond the said assembled elements, and a member extending through the said ends and adapted to exert force on said ends, tending to draw them together to bind the clamp against the handle and the strips.

GEORGE HENRY MAUS.